May 19, 1925.
M. R. HARHAY
STEAM AND AIR INJECTOR FOR INTERNAL COMBUSTION ENGINES
Filed June 11, 1924
1,538,039
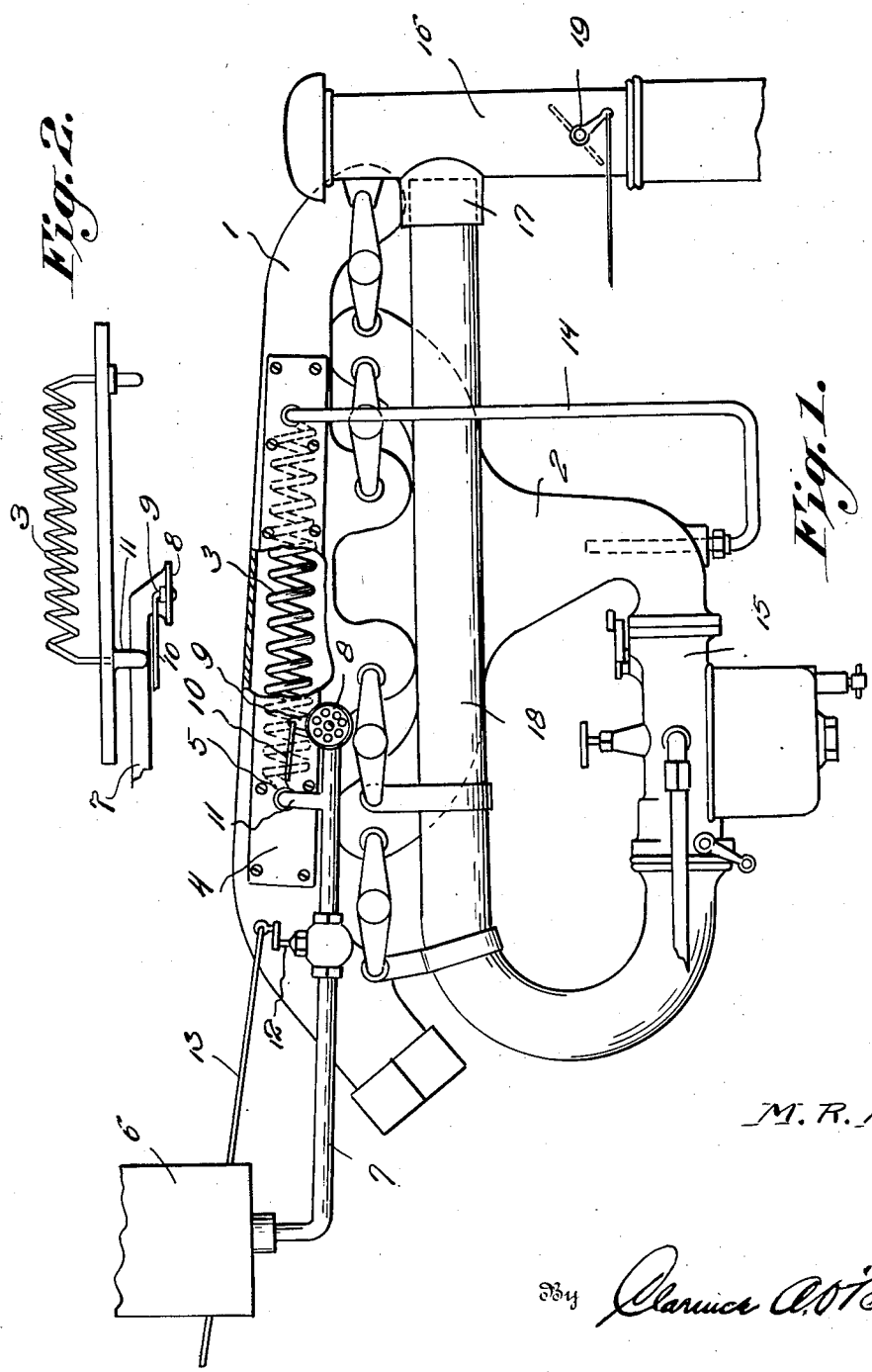

Patented May 19, 1925.

1,538,039

UNITED STATES PATENT OFFICE

MICHAEL R. HARHAY, OF HAVRE DE GRACE, MARYLAND.

STEAM AND AIR INJECTOR FOR INTERNAL-COMBUSTION ENGINES.

Application filed June 11, 1924. Serial No. 719,398.

*To all whom it may concern:*

Be it known that I, MICHAEL R. HARHAY, a citizen of the United States, residing at Havre de Grace, in the county of Harford and State of Maryland, have invented certain new and useful Improvements in Steam and Air Injectors for Internal-Combustion Engines, of which the following is a specification.

This invention relates to new and useful improvements in attachments for internal combustion engines and relates to an improvement over my copending application bearing Serial Number 711,919, filed May 8th, 1924.

One of the important objects of the present invention is to provide an attachment for injecting steam and air to the intake manifold whereby the consumption of fuel will be reduced and will further add to the efficiency in the operation of the internal combustion engine.

A further object of the invention is to provide an attachment of the above mentioned character, which includes a coil arranged in the exhaust manifold for generating steam to be supplied to the intake manifold, means being provided with the supply pipe to the coil pipe in the exhaust manifold for regulating the supply of water thereto.

A further object of the invention is to provide an attachment of the above mentioned character, which includes a means for reclaiming waste gases from the crank case and causing the same to be discharged into the air intake of the carburetor.

A further object of the invention is to provide an attachment of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 represents a side elevation of the intake and exhaust manifolds of an internal combustion engine as well as the breather pipe and carburetor showing my invention in position thereon.

Figure 2 is a top plan view of a portion of the device removed from the exhaust manifold.

In the drawing wherein for the purpose of illustration is shown the preferred embodiment of my invention, the numeral 1 designates the exhaust manifold, and the numeral 2 the intake manifold of an internal combustion engine preferably of the Ford type. Extending longitudinally within the exhaust manifold 1 is the coil steam generating pipe 3 and the same has its intake end extending through a plate 4 which is removably supported over the longitudinally extending opening provided in the exhaust manifold in the manner clearly illustrated in the drawing. The intake end 5 of the coil pipe 3 is disposed adjacent the rear portion of the exhaust manifold.

A water supply tank 6 is mounted rearwardly of the internal combustion engine in any suitable manner and extending forwardly therefrom is the conduit or supply pipe 7. The forward end thereof terminates in the air intake opening 8 and for the purpose of regulating the supply of air thereto I provide the valve construction designated generally by the numeral 9, the same being more fully set forth in my copending application. A rod 10 is associated with the valve mechanism for enabling the same to be actuated by the operator of the vehicle in the manner also set forth in my copending application. A branch pipe 11 extends from the supply pipe 7 adjacent the forward end thereof and communicates with the inlet end 5 of the coil pipe 3 whereby the water in the supply tank 6 may be delivered to the steam generating coil by the suction created in the manner hereinafter to be more fully described. For the purpose of regulating the supply of water which is delivered from the pipe 7 to the coil 3, I provide a valve 12 in the pipe 7, and a manually controlled operating means 13 therefor which extends rearwardly to within easy reach of the operator of the vehicle.

The discharge end of the coil pipe 3 extends through the plate 4 adjacent the forward end thereof communicating with the discharge end of the coil pipe 3 is the upper end of a conduit 14, the opposite end of which extends into the intake manifold 2 in the manner clearly illustrated in the drawing.

In operation, the suction of the engine causes the water in the pipe 7 to be delivered to the coil pipe 3 simultaneously causing a supply of air to be admitted through the opening 8 into the pipe 7 and the branch pipe 11 from which the same is admitted into the coil pipe 3. The coil pipe 3 which is disposed in the exhaust manifold will generate steam and deliver the vapor to the intake manifold where the same comes commingled with the charge from the carburetor 15.

For the purpose of reclaiming waste gases which collect in the crank case of the internal combustion engine, I provide the breather pipe 16 with a tubular extension 17 whereby communication between the breather pipe and the air intake end of the carburetor may be had by means of the conduit 18. One end of the conduit is connected to the air intake opening of the carburetor while the opposite end extends into the tubular extension 17. In this manner a quantity of air will be mixed with the gas coming up through the breather pipe, the air entering the breather pipe between the cap and the upper wall of the breather pipe in the manner well known in the art. The pipe 18 will conduct the waste gases and air to the air intake end of the carburetor 15 where the same are mixed with the charge which is delivered to the intake manifold. A valve such as shown at 19 is arranged in the breather pipe for controlling the supply of gases to the conduit 18 and the carburetor 15.

It will thus be seen from the foregoing description, that a steam and air injector has been provided which may be readily and easily attached to an internal combustion engine preferably of the Ford type and will not only increase the efficiency in the operation thereof but will also reduce the consumption of fuel necessary to operate the engine.

The simplicity of my device enables the same to be manufactured at a very low cost and will further be strong and durable.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

In an air and steam injector for internal combustion engines, a closing plate adapted to be mounted upon the engine exhaust manifold, said plate being provided adjacent its ends with openings, a steam coil disposed upon the inside of said plate, the ends of the coil terminating opposite and being in alignment with said openings, a water tank adapted to be supported adjacent said plate, a conduit connected at one end to and leading from said tank and extending into proximity to said plate, a valve in said conduit said conduit having its other end fashioned to provide an air intake valve and being provided between the valves with a branch extending through the adjacent one of the aforesaid openings in the plate and connected with the intake end of said coil, and a steam conducting pipe extending through the remaining opening and connected with the discharge end of said coil, the discharge end of said pipe being adapted to be connected with the engine intake manifold.

In testimony whereof I affix my signature.

MICHAEL R. HARHAY.